United States Patent
Powell, Jr. et al.

(10) Patent No.: US 7,722,708 B2
(45) Date of Patent: May 25, 2010

(54) AIR PURIFICATION APPARATUS AND METHOD

(75) Inventors: George P. Powell, Jr., 3312 Woodwardia Dr., Charlotte, NC (US) 28210; William E. Keeter, Mason, OH (US)

(73) Assignee: George P. Powell, Jr., Charlotte, NC (US)

( * ) Notice: Subject to any disclaimer, the term of this patent is extended or adjusted under 35 U.S.C. 154(b) by 1208 days.

(21) Appl. No.: 11/291,365

(22) Filed: Dec. 1, 2005

(65) Prior Publication Data

US 2007/0125230 A1  Jun. 7, 2007

(51) Int. Cl.
    *B01D 47/00* (2006.01)
(52) U.S. Cl. .............. 96/234; 96/272; 96/327; 261/29; 261/108
(58) Field of Classification Search ............ 95/210; 96/327, 234, 272; 261/29, 108; 422/120, 422/121, 122; 55/229, 234, 240
    See application file for complete search history.

(56) References Cited

U.S. PATENT DOCUMENTS

| | | | | |
|---|---|---|---|---|
| 3,047,718 | A | * | 7/1962 | Fleming et al. ............. 361/231 |
| 3,101,174 | A | * | 8/1963 | Loveland ..................... 239/27 |
| 3,757,495 | A | | 9/1973 | Sievers |
| 3,990,870 | A | | 11/1976 | Miczek |
| 4,351,652 | A | * | 9/1982 | Wisting ........................ 96/265 |
| 4,747,538 | A | * | 5/1988 | Dunn et al. .................. 239/20 |
| 4,961,763 | A | | 10/1990 | Thompson et al. |
| 5,277,877 | A | | 1/1994 | Jeffrey et al. |
| 5,656,242 | A | | 8/1997 | Morrow et al. |
| 5,704,954 | A | | 1/1998 | Takagi |
| 6,042,637 | A | | 3/2000 | Weinberg |
| 6,264,888 | B1 | | 7/2001 | Palestro et al. |
| 6,311,898 | B1 | | 11/2001 | Gruff |
| 6,503,302 | B2 | | 1/2003 | Wong |
| 6,503,458 | B1 | * | 1/2003 | Ogle ........................... 422/121 |
| 6,527,257 | B1 | * | 3/2003 | Schuld ......................... 261/29 |
| 6,533,033 | B2 | * | 3/2003 | Skillman ................. 166/105.1 |
| 6,544,320 | B2 | * | 4/2003 | Wong ............................ 96/240 |
| 6,589,489 | B2 | | 7/2003 | Morrow et al. |
| 6,779,739 | B2 | * | 8/2004 | Mulvaney ..................... 239/17 |
| 6,893,610 | B1 | * | 5/2005 | Barnes ........................... 422/4 |

* cited by examiner

*Primary Examiner*—Duane Smith
*Assistant Examiner*—Ives Wu
(74) *Attorney, Agent, or Firm*—Donald E. Hasse; Ronald J. Richter; Hasse & Nesbitt LLC

(57) ABSTRACT

An indoor air purification apparatus and method includes a watertight chamber including a top portion having a water inlet, a first air portal, a second air portal, a bottom portion, and a plurality of shelves mounted between the top portion and the bottom portion. Water continuously flows from the water inlet at the top of the chamber, typically falling over the shelves to a reservoir. Typically, a water pump returns the water to the water inlet at the top portion of the chamber through at least one conduit leading from the reservoir. An air pump typically drives the room air through the chamber from one air portal to the other and back into the room. The room air is purified as it mixes with the water cascading over the shelves.

11 Claims, 3 Drawing Sheets

AIR PURIFICATION APPARATUS AND METHOD

FIELD OF THE INVENTION

This invention relates to an air purification apparatus and method to purify the air of an indoor room, and in particular to an air purification system using cascading water to maximize the exposure of the air to water within the system.

BACKGROUND OF THE INVENTION

The environment within homes, offices, and other indoor facilities is often contaminated with a variety of pollutants of both gaseous and particulate matter. Organic aerosols, viral microbes, bacterial microorganisms, tobacco smoke, dust, pollen, mold, mildew, allergens, yeasts, parasites, and organic vapors including malodors containing amines and are typically found floating in the air. Such gaseous and particulate matter may pose a health hazard to humans due to either the chemical nature of the particle or by the particle's physical size. Some airborne particles may merely have an unpleasant odor (usually from chemicals or amines) others may accumulate onto surfaces, while others may actually pose a health hazard to those exposed to the materials. Studies have shown that exposure to second-hand tobacco smoke significantly increases one's risk of developing lung cancer. Statistically, it is known that indoor air can be 40 to 70 times more polluted than outdoor air, that most people spend 80-90% of their time indoors, that 50% of all illness is caused or aggravated by polluted indoor air, and that the average home accumulates over 40 pounds of dust a year.

Many devices have been marketed over the years in an attempt to assist in this regard. Room air fresheners only serve to mask the odors and do nothing to remove the gases or particulate matter from the air. Activated charcoal filters and HEPA filters are fairly expensive and tend to lose their effectiveness progressively with use. HEPA filters in particular are extremely expensive and are generally not practical when used to sterilize the air, since they only gather bacteria and do not kill them, and viruses are too small to be trapped by HEPA filters.

It is known that negatively charged ions have the effect of purifying the atmosphere. This process, known as ionization, occurs naturally under the influence of energy from such sources as lightning, sunlight and waterfalls. In fact, the discovery of the phenomenon of ionization occurring around waterfalls was considered so significant that it was named the "Lenard Effect" after its discoverer, the German scientist Philipp Lenard (1862-1947), and is also sometimes referred to as the "waterfall effect." In contrast, a typical indoor area has a markedly increased ratio of positive to negative ions. Central heating and air conditioning, smoking, the usual household activities of dusting and cooking all combine to lower levels of negative ions in indoor environments. Further, the static electricity generated by synthetic fibers in clothing and room furnishing adds a different dimension to the indoor climate which is not conducive to the preservation of negative air ions.

It is known that ultraviolet light is an effective germicide, capable of destroying microorganisms in the air. As contaminated air is passed through intense ultraviolet light, bacteria, viruses and some organic compounds are destroyed. Ultraviolet light is also commonly used in much the same way to kill waterborne particles. The ultraviolet wavelength damages the DNA of microorganisms and renders them harmless and unable to reproduce.

Passing air through ultraviolet light creates activated oxygen atoms, known as ozone ($O_3$) molecules, popularly known for their ability to combine with airborne impurities. Ozone generators using corona discharge also exist, which can be added to air and water purification devices. Ozone is unstable and cannot exist on its own. Rather, the extra oxygen atom quickly becomes detached from the ozone molecule and reattaches to other airborne molecules. Thus, ozone is typically converted to more stable molecules such as oxygen ($O_2$), carbon-dioxide ($CO_2$), and water ($H_2O$). This is the basis for ozone air purifiers, which are used to purify large areas by releasing ozone-enriched gaseous plasma into the air that seeks out airborne contaminants.

In light of the above, it is an object of the present invention to provide an air purification apparatus and method that uses cascading water to cleanse and purify indoor air. It is also an object to provide an indoor air purifier that uses ultraviolet light to effectively destroy bacterial and viral microorganisms. Another object is to provide an air purifier that uses ozone to purify the indoor air. It is a further object to provide an indoor air purifier that it is simple to operate and requires low-cost materials and few replacement parts. It is also an object to provide a purifier that is aesthetically attractive as a permanent fixture in the indoor environment.

SUMMARY OF THE INVENTION

Accordingly, the present invention provides an air purification apparatus and method that includes an attractive portable or stationary unit that may be positioned in a desired closed environment such as an office or living room to purify the air therein and to remove contaminants such as gaseous and particulate pollutants.

A first aspect of the invention is an air purification apparatus comprising (a) a watertight chamber comprising a top portion having a water inlet, a bottom portion, a first air portal, a second air portal, and a plurality of shelves mounted between the top portion and the bottom portion; (b) a means for supplying water to the water inlet; and (c) a means for driving room air through the chamber from one air portal to the other, whereby water supplied to the water inlet falls from the top portion of the chamber and cascades over the plurality of shelves to the bottom portion of the chamber, the cascading water mixing with and purifying the room air as it is driven through the chamber. In one embodiment, the means for driving room air through the chamber can be an air pump in fluid communication with room air outside the chamber. Further, the means for driving room air through the chamber can be adapted to drive room air from the first air portal to the second air portal, or it can be adapted to drive room air from the second air portal to the first air portal (i.e. reversal of air flow). In one embodiment, the apparatus can include a reservoir for holding a quantity of water therein and located beneath the bottom portion, and at least one conduit having a first end positioned for receiving water from the reservoir and a second end positioned for supplying water to the water inlet. In this embodiment, the means for supplying water to the water inlet can comprise a water pump in fluid communication with the reservoir and the at least one conduit for driving water from the reservoir through the at least one conduit to the water inlet. In another embodiment, the means for supplying water can be a water faucet, and the bottom portion of the chamber can include a drain for emptying the water after it has passed over the shelves.

A second aspect of the invention is an air purification apparatus comprising (a) a watertight chamber comprising a top portion having a water inlet, a bottom portion, a first air portal, and a second air portal; (b) a plurality of shelves mounted within the chamber between the top portion and the bottom portion; (c) a reservoir in fluid communication with the bottom portion for holding a quantity of water therein; (d) at least one conduit having a first end positioned for receiving water from the reservoir and a second end positioned for supplying water to the water inlet; (e) a water pump in fluid communication with the reservoir and the at least one conduit for driving water from the bottom portion to the water inlet; and (f) an air pump in fluid communication with room air outside the chamber for driving room air through the chamber from one air portal to the other, whereby water supplied to the water inlet falls from the top portion of the chamber and cascades over the plurality of shelves to the reservoir, mixing with and purifying the room air driven through the chamber. In one embodiment, the reservoir, the at least one conduit and the water pump can be contained within the watertight chamber, so that the apparatus is a single enclosed unit. Further, the water pump can be a submersible pump positioned within the reservoir beneath the water level.

A third aspect of the invention is a method of air purification, comprising the steps of (a) providing a watertight chamber for mixing water and room air, the chamber comprising a top portion having a water inlet, a bottom portion, a first air portal, a second air portal, and a plurality of shelves mounted between the top portion and the bottom portion; (b) supplying water to the water inlet, causing the water to cascade over the shelves as it falls to the bottom portion; and (c) driving room air through the chamber from one air portal to the other to mix the cascading water with the room air driven through the chamber, whereby the room air driven through the chamber is purified. In one embodiment, the step of supplying water to the water inlet can include driving the water to the water inlet through at least one conduit leading from a reservoir for holding a quantity of water therein located at the bottom portion of the watertight chamber, the watertight chamber further comprising the reservoir, the at least one conduit, and a water pump in fluid communication with the reservoir and the at least one conduit for driving water from the bottom portion to the water inlet. In another embodiment, the watertight chamber can further comprise an air pump in fluid communication with room air outside the chamber for driving room air through the chamber from one air portal to the other.

The watertight chamber disclosed herein can include a germicidal light source positioned for directing radiant energy toward both air and water within the chamber, and the germicidal light source can emit ultraviolet light capable of producing ozone. Alternatively, the germicidal light source can be located within a housing of an irradiation compartment, and the irradiation compartment can be located in the reservoir and/or integrally formed with the reservoir, positioned for directing radiant energy toward the water. In another embodiment, the irradiation compartment can be located outside of the reservoir, and a portion of the at least one conduit can extend through the housing of the irradiation compartment. The portion of the at least one conduit that extends through the irradiation compartment can be constructed of either an ultraviolet transparent or ultraviolet translucent material, such that ultraviolet light is transmitted to the water through that portion of the conduit. Further, the pump can be positioned downstream or upstream of the irradiation compartment. When the pump is positioned downstream of the irradiation compartment, microbes that may be present in the water are substantially reduced or eliminated before reaching the pump. An ozone source positioned for directing ozone toward the air and water within the chamber can also be included with the apparatus.

These and other advantages and features of the invention will be apparent upon reading the following detailed description of presently preferred embodiments of the invention.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF PREFERRED EMBODIMENTS

Definitions: As used herein, the term "purify" shall mean to recycle and to remove pollutants, such as gaseous and particulate matter, including, for example, organic aerosols, viral microbes, bacterial microorganisms, tobacco smoke, dust, pollen, mold, mildew, allergens, yeasts, parasites, and organic vapors including malodors containing amines. As used herein, the term "water" shall mean a liquid containing or resembling water, such as a cosmetic preparation made with water. As used herein, the term "watertight" shall mean of such tight construction or fit as to be impermeable to water except when under sufficient pressure to produce structural discontinuity.

Figure 1:
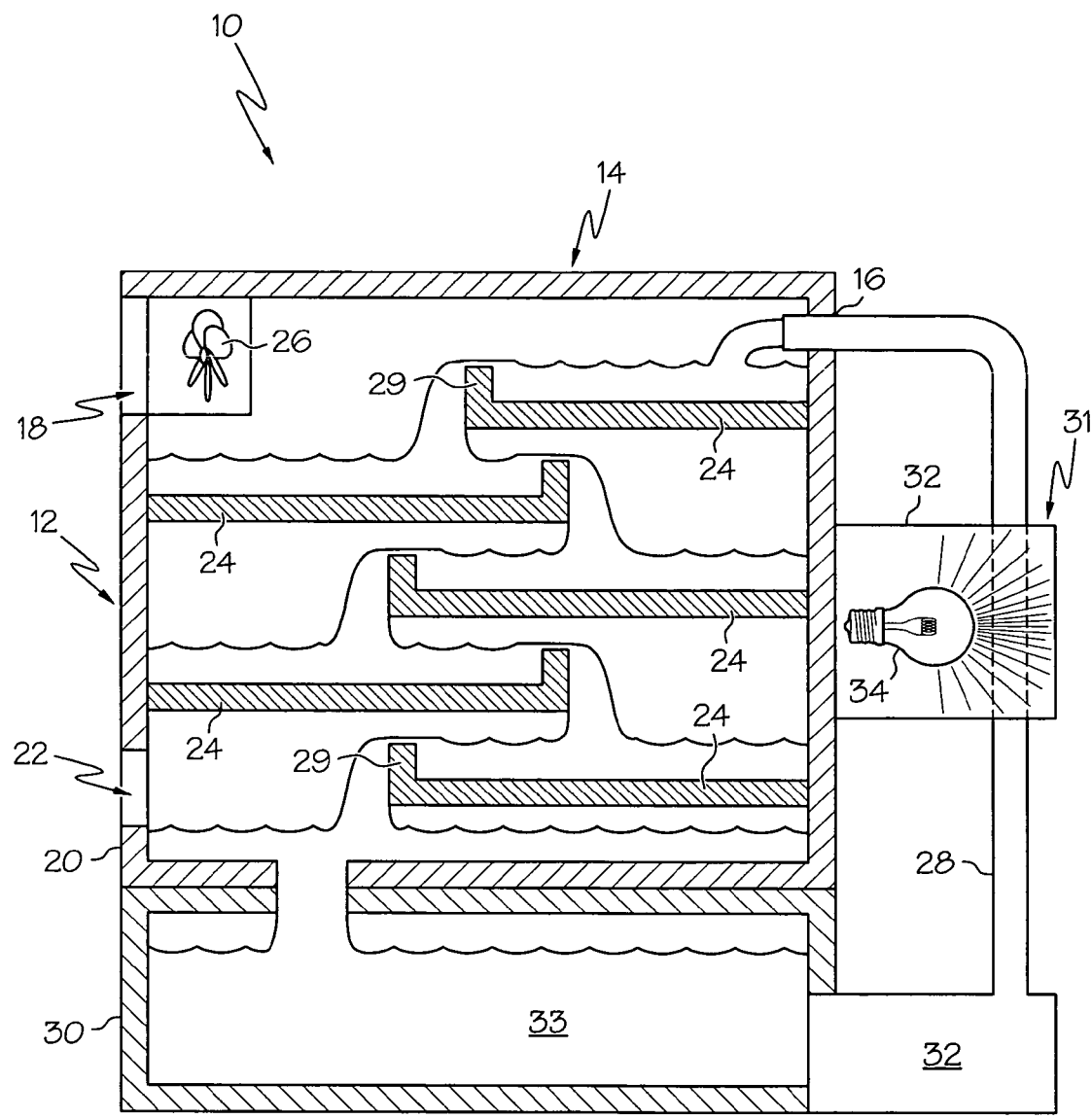
FIG. 1 is a cross-sectional side view illustrating the structure of one embodiment of the air purifying apparatus according to the present invention.

Referring now to FIG. 1, one embodiment of the air purification apparatus 10 includes a watertight chamber 12 having a top portion 14 with a water inlet 16, a first air portal 18, a bottom portion 20, a second air portal 22, and a plurality of shelves 24 mounted between the top portion 14 and the bottom portion 20. An air pump 26 or fan draws in room air from outside the chamber 12 via the first air portal 18, and drives the air through the chamber, causing air to flow between the shelves 24 within the chamber 12, mixing with the water cascading down the shelves 24, before exiting the second air portal 22. A water conduit 28 leads from a separate water reservoir 30 located beneath the bottom portion 20 of the watertight chamber 12. A water pump 32 drives the water 33, which has cascaded over the shelves 24 to the bottom portion 20 and into the reservoir 30, back up through the conduit 28 to the water inlet 16 at the top portion 14 of the chamber 12. Thus, one end of the conduit 28 is positioned for receiving water from the reservoir 30, and another end is positioned for supplying water 33 to the water inlet 16.

In FIG. 1 an irradiation compartment 31 comprising a housing 32 and a germicidal light source 34 is positioned externally to the chamber 12, and a portion of the water conduit 28 extends through the housing 32. The germicidal light source 34 is typically an ultraviolet lamp. The portion of the conduit 28 passing through the irradiation compartment 31 is constructed of a material that is either transparent or translucent to ultraviolet light, so that light is transmitted through the water 33 that passes through the conduit 28, to kill any microbes present in the water. The germicidal light source 34 thus directs radiant energy through the water passing upwards through the conduit 28. In this embodiment, the water pump 32 is positioned downstream of the irradiation compartment 30. However, the irradiation compartment 31 may also be positioned downstream from the water pump 32, for example within the reservoir 30 and before the water reaches the pump. With this arrangement, microbes that may be present in the water are substantially reduced or eliminated before reaching the pump.

In use, the watertight chamber 12 provides a suitable arena for mixing water 33 and room air, and when water is supplied to the water inlet 16 at the top 14 of the chamber, the water falls by gravity, cascading over the shelves 24 as it falls to the bottom portion 20. Simultaneously, room air is driven through the chamber 12 from the one air portal to the other, so that the cascading water mixes with the room air driven through the chamber to purify and recycle the air before it exits the chamber. The air pump 26 can be adapted to drive room air from the first air portal 18 to the second air portal 22, as shown, or it can be adapted to drive room air in the reverse direction, from the second air portal 22 to the first air portal 18.

Figure 2:
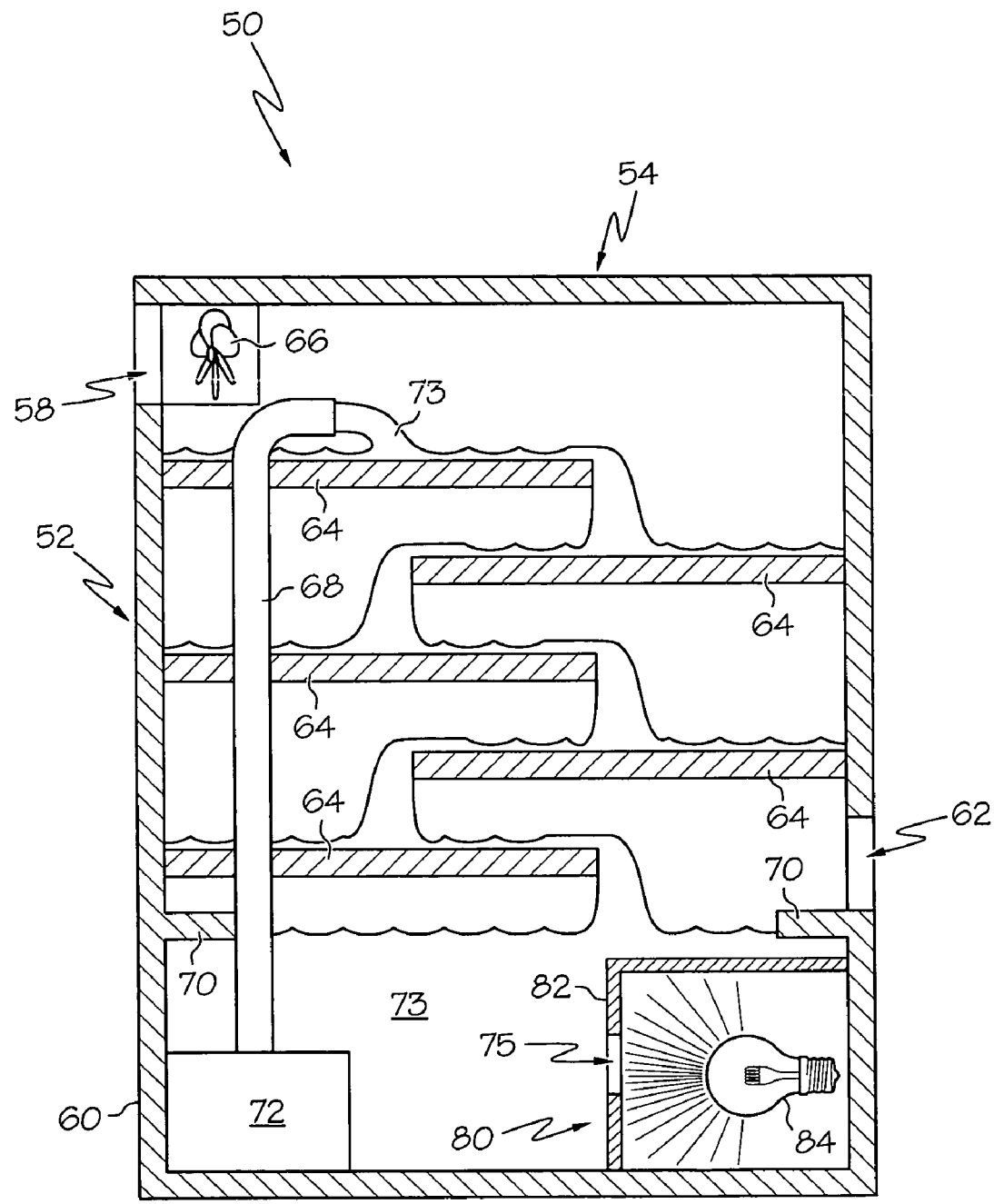
FIG. 2 is a cross-sectional side view illustrating the structure of another embodiment of the air purifying apparatus according to the present invention.

FIG. 2 illustrates another embodiment of an apparatus 50 of the present invention, including a watertight chamber 52 having a top portion 54, a first air portal 58, a bottom portion 60, a second air portal 62, and a plurality of shelves 64 mounted between the top portion 54 and the bottom portion 60. An air pump 66 (typically a fan, as illustrated) draws in room air from outside the chamber 52 via the first air portal 58, and drives the air through the chamber and out the second air portal 62. As noted above, the air pump 66 can be placed at the second air portal 62, to drive the air in a reverse direction from the second portal 62 through the chamber and out the first air portal 58. A conduit 68, a reservoir 70 and a water pump 72 are contained within the watertight chamber 52, so that the chamber 52 houses the entire apparatus as a single unit. Further, the water pump 72 as shown is a submersible pump positioned to contact the water 73 within the reservoir.

The embodiment shown in FIG. 2 also includes a germicidal light source 84 submersed below the water 73 in the reservoir. The germicidal light source 84 is part of an irradiation compartment 80 including a housing 82, with the germicidal light source 84 positioned in the housing for projecting ultraviolet light toward the water 73 within the housing 82 and the reservoir 70. An opening 75 is provided for admitting water into the housing from the reservoir, and one or more vent holes (not shown) may also be provided in the housing so that the water can fill the housing. It will be understood that the irradiation compartment can either be integrally formed with the reservoir, or may be separately formed and positioned for projecting ultraviolet light into the reservoir.

Figure 3:
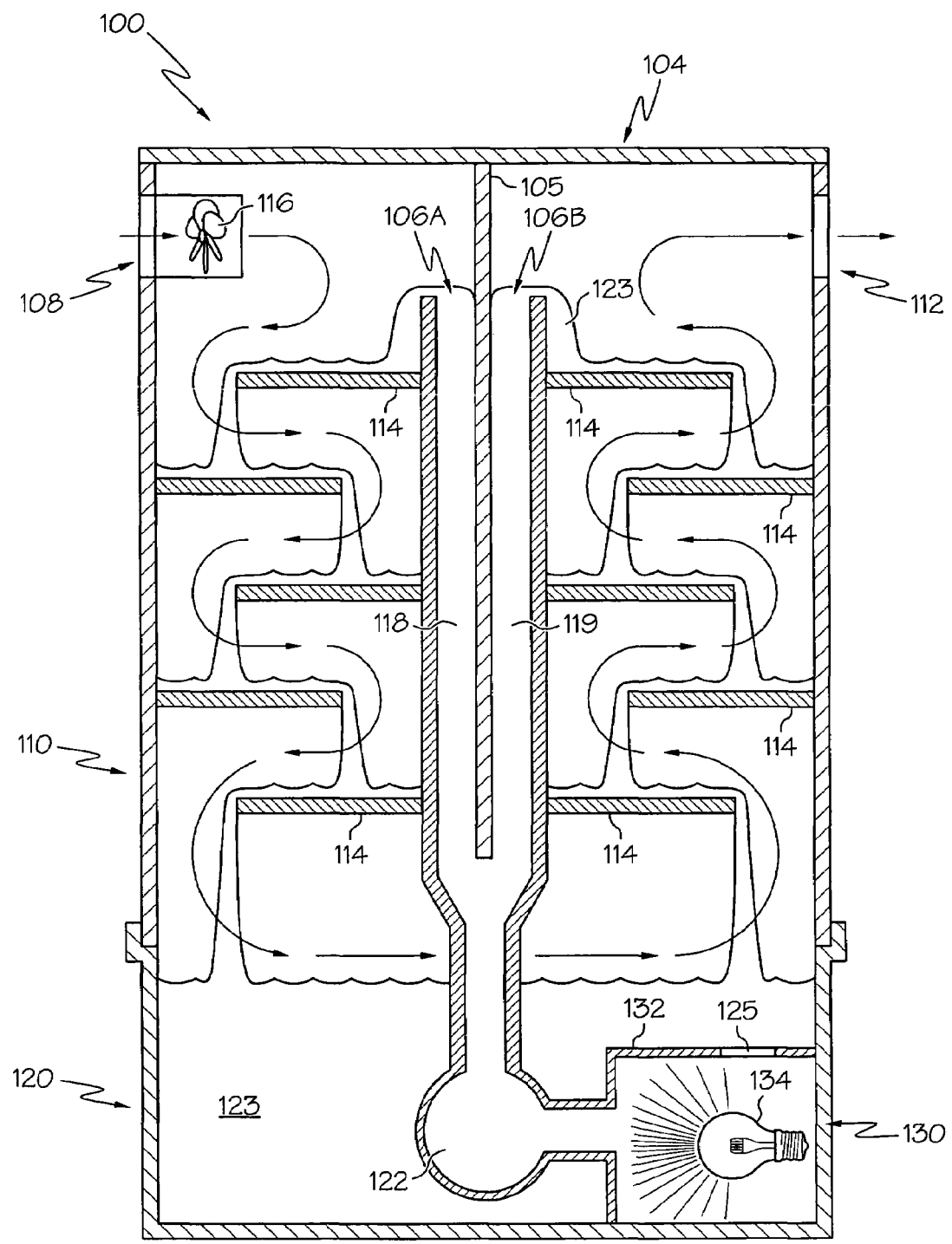
FIG. 3 is a cross-sectional side view illustrating yet another embodiment of the air purifying apparatus according to the present invention.

FIG. 3 illustrates another embodiment of an apparatus 100 of the present invention, in which the chamber has a top portion 104 containing a central divider or wall 105. The end portions of two conduits 118,119 create a water inlet 106A, 106B within the top portion 104 of the chamber. Conduits 118 and 119 travel along the length of the central wall 105, and are connected to water pump 122. The water pump 122 is submersed within a reservoir 120 and drives water 123 through the conduits 118, 119 to the water inlet 106A, 106B. Water 123 exits the first conduit 118 at water inlet 106A and flows to the left of the central wall 105. Similarly, water 123 also exits the second conduit 119 at water inlet 106B, flowing to the right of the central wall 105. Shelves 114 on both sides of the wall 105 then receive the water 123 as it enters the top portion 104 of the chamber via the water inlets 106A, 106B. Water then cascades over the shelves 114 on both sides of the central wall 105, falling from the top portion 104 to the bottom portion 110 of the chamber and flowing into the reservoir 120 below.

The arrows illustrated in FIG. 3 depict the direction of airflow through the chamber. In this embodiment, air is effectively cleansed twice, first at the side of the first air portal 108 and again on the side of the second air portal 112. Following the arrows: room air enters the apparatus 100 as it is driven by fan 116 through the first air portal 108. From there, the air is caused to flow from the top 104 to the bottom 110 of the left side of the chamber, thereafter flowing over the water 123 in the reservoir 120 and beneath the central wall portion 105, and then from the bottom 110 back to the top 104 of the right side of the chamber and out the second air portal 112. Thus, as the air moves from the top to the bottom to the top again, it traverses the shelves 114 on two separate occasions and mixes with the cascading water to remove particulate and gaseous materials from the air. The air pump 116 can be adapted to drive room air from the first air portal 108 to the second air portal 112, as shown, or it can drive room air in the reverse direction, from the second air portal 112 to the first air portal 108. In an alternative embodiment, a second air pump (not shown) can be included in the chamber, positioned near the second air portal 112 to pull the air introduced by the first air pump 116 at the first air portal 108 through the chamber and out the second air portal 112.

In FIG. 3 an irradiation compartment 130 including a light inhibiting housing 132 and a germicidal light source 134 are present in the reservoir 120 to further cleanse and disinfect the water 123. Compartment 130 is fluidly connected to the water pump 122, and water in the reservoir 120 can enter the compartment 130 via opening 125. Further, one or more vent holes (not shown) may also be provided to admit water into the housing 132. In this embodiment, the water pump 122 is located downstream of the irradiation compartment 130. Water that has been irradiated by the light source 134 is directed from within the housing 132 into the pump 122, and returned via conduits 118 and 119 to the water inlet 106 at the top portion 104 of the chamber.

The germicidal light source is typically an ultraviolet lamp that emits ultraviolet light to kill microbes present in both the air and the water. Typically, the ultraviolet lamp can be fitted through an inlet of the chamber within the housing of the irradiation compartment, and a waterproof sleeve (e.g. a quartz sleeve) can safely hold the lamp in place. The ultraviolet lamp can emit a wavelength capable of producing ozone to further cleanse the air and water. Typically, an ultraviolet wavelength of between about 110 to about 200 nanometers, and more typically about 185 nanometers, is used for producing ozone. Alternatively, another source of ozone can be provided, such as a corona discharge device or venturi/ozone device, which is separate from the germicidal light source. If the germicidal light source is housed within an irradiation compartment, the housing of the irradiation compartment is typically made of a dark, ultraviolet opaque material, capable of absorbing the ultraviolet light so that it is contained within the apparatus and inhibited from spreading throughout the room.

From time to time it may be desirable to empty the water present in the chamber, to ensure maximum air cleaning capability for the apparatus, i.e. to maximize the water's ability to cleanse the air. Therefore a drain can be included in the chamber or in the reservoir to easily allow drainage of water from the chamber. Further, it is anticipated that the apparatus can be easily disassembled for cleaning, with the shelves and other small parts, including the conduit(s), sized to fit into a typical home dishwashing machine. For example, the shelves can be removable inserts that are detachable from the chamber walls for easy cleaning.

The shelves of the apparatus are typically housed substantially horizontally within the chamber, but can also be angled up or down slightly from horizontal to help direct the water and the air along their predetermined path. As a non-limiting example, in order to create pooling of water on the shelves, they can be positioned to depend from the chamber walls at a 30° angle above horizontal. The ledges or shelves can also include a variety of tips on their end (e.g. T-tip, L-tip, rounded, serrated, etc.), which can act to direct the water in a certain pattern, or sheets or cascades. For example, FIG. 1 illustrates shelves with an L-tip which can hold a "pool" or volume of water on their surface, to maximize the surface area over which air and water come into contact. The shelves can also have grooves, holes, slits and or patterns inscribed in the floor or sides to achieve a certain desired effect. As a non-limiting example, the shelves can have slits formed therein to allow small amounts of water to flow through each shelf, creating a water coating on the bottom of the shelf and on the side of the chamber wall beneath it. Thus, the chamber walls can display a "wall of water", such that no splash droplets will appear along the chamber walls. In all embodiments, the shelves can be free standing on a support such as a vertical wall, or free hanging from other supports such as wires.

As water cascades over the shelves of the apparatus, small waterfalls are created, and the sound created by the waterfalls are intended to be soothing to the ear of the user. To this end, the typical vertical distance that the water falls between shelves is between about 0.5 inches to about 8 inches, more typically between about 1 inch to about 6 inches, and even more typically between about 2 inches to about 4 inches. Also, the air pumps used with the apparatus are intended to be small, quiet pumps or fans that do not drown out the sounds of the cascading water. A fan of most any type or design can be used to drive the air through the waterfalls and to bounce air off of the wet walls or surfaces. Non-limiting examples of fans include axial, squirrel cage, blade type, etc. Further, in order to silence any splashing noise created by the final descent of water into the reservoir, the final shelf, or the bottom of the chamber, may be positioned to create a gradual decline as it leads to the reservoir, so that the water does not splash noisily into the reservoir. The reservoir is typically adapted to hold from between about 0.5 to about 4 gallons, more typically from between about 1.5 to about 2 gallons of water. Because over time water may evaporate from the chamber, the top portion of the chamber may include a hatch, through which water may be added. Alternatively, a water auto-filler may be included with the reservoir, similar to the water filler for an ice machine in a typical refrigerator, along with a float valve to keep water level constant.

The apparatus of the present invention is intended to be simple to operate and require low-cost materials and few replacement parts. It is intended that the apparatus be aesthetically attractive as a permanent fixture in the indoor environment. For example, the chamber can be made into any geometrical shape, i.e. a diamond shape, a pyramid shape, a circular shape, etc. and placed on top of the reservoir. Further, the chamber walls are intended to be transparent or translucent, so the user may enjoy watching the waterfalls. However, the chamber walls can also be opaque and colorful, if desired. Such different designs are purely non-functional, but are anticipated as being part of an embodiment of the present invention.

The apparatus can be a small portable air purifier, small enough to fit on a tabletop or desk, or the apparatus can be a larger floor model, perhaps being placed on wheels and moved about from room to room. The chamber, including component parts such as the shelves and the conduit, can be constructed of a variety of materials. As a non-limiting example, materials that can be used include glass, a flexible or rigid plastic material such as Lexan polycarbonate, polyethylene, PVC, polypropylene, or also metals such as stainless steel, aluminum, etc. If plastics are used, it is intended that plasticizers or other odor-emitting substances within the material are not transferred from them to the liquid passing therethrough. Although not necessary for use, the apparatus may also include a small washable water filter, for cleaning of debris such as dead microorganisms, dust, pollen, mold spores, and other particulate matter removed from the air. This is particularly useful for a small water pump, to keep it from becoming clogged with such particulate matter.

Typically the reservoir, conduit and water pump are present to recirculate the water through the chamber in a cost-effective manner. However, these elements are not necessary for the proper function of the apparatus of the present invention. In an alternative embodiment of the apparatus (not shown), water can be supplied through a water inlet at the top portion of the chamber by some other water supplying means such as a water faucet, and a water removing means such as a drain can empty the water from the chamber as it reaches the bottom portion of the chamber, where it can be recycled through another water treatment system. However, this embodiment may not be very cost-effective.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An air purification apparatus comprising:
    a. a watertight chamber comprising a top portion having a water inlet, a bottom portion, a first air portal, a second air portal, and a plurality of shelves mounted between the top portion and the bottom portion;
    b. a means for supplying water to the water inlet; and
    c. a means for driving room air through the chamber from one air portal to the other, whereby the watertight chamber encloses the entire apparatus, and water supplied to the water inlet falls from the top portion of the chamber and cascades over the plurality of shelves to the bottom portion of the chamber, the cascading water mixing with and purifying the room air as it is driven through the chamber, the top portion further comprising a central wall adapted to cause water entering the water inlet to flow to either the right side or the left side of the chamber, the apparatus further comprising a reservoir in fluid communication with the bottom portion for holding a quantity of water therein, a right conduit and a left conduit, each conduit having a first end positioned for receiving water from the reservoir and a second end positioned for supplying water to the water inlet, and wherein the means for supplying water to the water inlet is a water pump, the water pump being in fluid communication with the reservoir and the conduits for driving water from the bottom portion to the water inlet.

2. The air purification apparatus of claim 1, wherein the reservoir, the at least one conduit and the water pump are contained within the watertight chamber.

3. The air purification apparatus of claim 1, wherein the water pump is a submersible pump and is positioned within the reservoir for contacting the water.

4. The air purification apparatus of claim 1, further including an irradiation compartment having a housing and a germicidal light source positioned for directing radiant energy toward the air and water within the chamber.

5. The air purification apparatus of claim 4, wherein the irradiation compartment is located within the reservoir.

6. The air purification apparatus of claim 4, wherein the irradiation compartment is located outside of the reservoir.

7. The air purification apparatus of claim 4, wherein a portion of the each of the conduits extends through the housing of the irradiation compartment, the portion extending through the housing of the irradiation compartment constructed of either an ultraviolet transparent or ultraviolet translucent material, such that ultraviolet light is transmitted to the water through that portion of the conduit.

8. The air purification apparatus of claim 4, wherein the water pump is positioned downstream of the irradiation compartment.

9. A method of air purification, comprising:
 a. providing a watertight chamber for mixing water and room air, the chamber comprising a top portion, a bottom portion, a reservoir, a first air portal, a second air portal, and a plurality of shelves mounted between the top portion and the bottom portion, the top portion comprising a central wall and a water inlet, the central wall adapted to cause water entering the water inlet to flow to either the right side or the left side of the chamber, the reservoir being in fluid communication with the bottom portion for holding a quantity of water therein;
 b. supplying water to the water inlet, causing the water to cascade over the shelves as it falls to the bottom portion; and
 c. driving room air through the chamber from one air portal to the other to mix the cascading water with the room air driven through the chamber, whereby the watertight chamber encloses the entire apparatus, and the room air driven through the chamber is purified, and wherein the watertight chamber houses the entire method therewithin.

10. The method of claim 9, wherein the step of supplying water to the water inlet comprises driving the water to the water inlet through a right conduit and a left conduit, each conduit leading from the reservoir, the watertight chamber further comprising the right and left conduits and a water pump in fluid communication with the reservoir and the conduits for driving water to the water inlet.

11. The method of claim 9, wherein the watertight chamber further includes an air pump in fluid communication with room air outside the chamber for driving room air through the chamber from one air portal to the other.

* * * * *